United States Patent [19]
Kopp

[11] Patent Number: 4,768,991
[45] Date of Patent: Sep. 6, 1988

[54] CYLINDRICAL LOW FRICTION SLIP CLUTCH

[75] Inventor: Norman L. Kopp, Caledonia, Ill.

[73] Assignee: Sundstrand Corporation, Rockford, Ill.

[21] Appl. No.: 12,990

[22] Filed: Feb. 10, 1987

[51] Int. Cl.$^4$ .............................................. F16D 7/06
[52] U.S. Cl. ........................................ 464/36; 192/56 R
[58] Field of Search .................. 192/56 R; 464/30, 35, 464/36

[56] References Cited

U.S. PATENT DOCUMENTS

| | | | |
|---|---|---|---|
| 1,883,164 | 10/1932 | Vassakos | 464/36 X |
| 2,268,373 | 12/1941 | Cartlidge | 464/36 |
| 3,205,985 | 9/1965 | Pearl | 192/56 R |
| 3,797,620 | 3/1974 | Haller | 464/35 X |
| 4,075,873 | 2/1978 | Geisthoff | 192/56 R |
| 4,294,340 | 10/1981 | Kunze | 464/36 X |
| 4,557,154 | 12/1985 | Iwata et al. | 192/56 R |

FOREIGN PATENT DOCUMENTS

| | | | |
|---|---|---|---|
| 2071236 | 9/1981 | United Kingdom | 464/35 |
| 309172 | 9/1971 | U.S.S.R. | 192/56 R |
| 561031 | 6/1977 | U.S.S.R. | 464/36 |
| 570736 | 8/1977 | U.S.S.R. | 464/35 |
| 750169 | 7/1980 | U.S.S.R. | 192/56 R |

Primary Examiner—Daniel P. Stodola
Attorney, Agent, or Firm—William D. Lanyi

[57] ABSTRACT

A slip clutch is provided with three rotatable members disposed in coaxial and concentric relationship with each other. A first rotatable member is provided with a groove in a first cylindrical surface and a second rotatable member is provided with a second groove in a second cylindrical surface. A spherical ball or, alternatively, a roller bearing is disposed in the first and second grooves at their point of intersection. A spline arrangement is provided between the second and third rotatable members to permit these members to move axially with respect to each other but to prevent relative rotational movement between the second and third rotatable members. A bias force is provided by a spring which exerts an axial force against the second rotatable member. The spring can be adjusted to cause a variation in the required torque necessary to cause slippage of the clutch mechanism. When relative torque is experienced between the first and second rotatable members, the spherical ball moves within the first and second grooves and the second rotatable member moves axially relative to the first rotatable member. This axial movement causes the spring to compress to achieve a balance between the force provided by the spring and the force provided by the relative torque between the first and second rotatable members. An extreme overtorque condition will cause the second rotatable member to continually reciprocate in an axial direction.

29 Claims, 5 Drawing Sheets

CYLINDRICAL LOW FRICTION SLIP CLUTCH

BACKGROUND OF THE INVENTION

1. Field of the Invention

The present invention is directed generally to a slip clutch, and more particularly, to a clutch apparatus which disposes one or more spherical balls in grooves formed in the inner and outer cylindrical surface of concentrically disposed rotatable members.

2. Description of the prior art

Many types of slip clutches are known to those skilled in the art. In certain types of these applications, spherical balls are disposed in grooves that are shaped in generally flat radial surfaces of clutch members. For example, an overload clutch is described in U.S. Pat. No. 4,294,340 which issued to Kunze on Oct. 13, 1981. It discloses a clutch that includes a driving member, a driven member and clutch engagement members that are rotatably held in apertures formed in either the driving or driven member with recesses formed in the other member. The clutch engagement members engage to effect clutch torque transmission and the clutch is structured to include a control ring having recesses formed therein. The control ring is held by a circumferential spring in a first position and enables the clutch to be moved to a second position which represents a disengaged position.

U.S. Pat. No. 4,075,873 which issued to Geisthoff on Feb. 28, 1978 describes a free-wheeling overload coupling apparatus in which first and second coupling members are rotatable relative to each other. These coupling members are fixed axially with respect to each other with a third coupling member rotatably disposed between them. It disposes a plurality of torque transmitting balls circumferentially spaced in one of the members and spring biased axially toward the other member. The overload coupling described in the Geisthoff patent causes a disengagement between its components when an overtorque condition exists. This disengagement is reset manually for future operation.

U.S. Pat. No. 3,205,985 which issued to Pearl on Sept. 14, 1965 discloses a torque responsive clutch for use in association with power tools wherein the clutch is disengaged in response to a predetermined torque and remains disengaged until it is automatically reset through normal operation of the tool. The Pearl patent describes a torque responsive clutch which disposes a plurality of cylinders between inner and outer tapered bores. The inner bore comprises a plurality of lobes which, upon an overtorque condition, cause the cylinders to move radially outward toward the outer tapered bore. The outer member is deformable and permits the cylinders to pass over the lobes which provides the slippage between the driving and driven members.

Clutches of the type described above typically utilize frictional forces between driving and driven members to transmit torque therebetween. When sliding friction is used in this way by a clutch apparatus, accurate setting of the break away torque value is difficult because of the inherent variability that is typical in friction devices. The coefficient of friction between clutch members can vary by significant amounts and this variability adversely affects the precision with which the actuation torque of the slip clutch can be set.

SUMMARY OF THE INVENTION

The present invention provides a slip clutch which does not rely on frictional forces existing between clutch members. Instead, it utilizes concentric inner and outer cylindrical surfaces of coaxially disposed rotatable members which have grooves formed in them. One or more spherical balls are disposed in the grooves to connect the rotatable members. When an overtorque condition occurs, the spherical balls rotate, or roll, in the grooves to permit one of the rotatable members to move both rotationally and axially with respect to the other. An axial force acting against one of the rotatable members in cooperation with the ramp angle or incline of the grooves determines the magnitude of torque required to cause this relative motion.

A preferred embodiment of the present invention will be described in which a first rotatable member is disposed within a second rotatable member and the second rotatable member is disposed within a third rotatable member. However, it should be understood that, in an alternative embodiment of the present invention, the first rotatable member can be disposed radially outward from the second rotatable member and the second rotatable member can be disposed radially outward from the third rotatable member. The distinctions between these two embodiments of the present invention relate to the location of the first and second grooves. These grooves can be formed in the inner cylindrical surface of the outermost rotatable member and the outer cylindrical surface of the middle rotatable member or, alternatively, in the outer cylindrical surface of the innermost rotatable member and the inner cylindrical surface of the middle rotatable member. It should be understood that either embodiment of the present invention can be preferable, depending on the particular application for which the present invention is to be used. The selection of one of the embodiments of the present invention over other embodiments is determined by the physical constraints of the application and both embodiments of the present invention, which will be described below, are to be considered within the scope of the present invention.

The clutch mechanism of the present invention comprises three rotatable members. In a preferred embodiment of the present invention, a first rotatable member is provided with an outer cylindrical surface shaped to define a first groove. A second rotatable member is provided with an inner cylindrical surface shaped to define a second groove. The second rotatable member is disposed in coaxial and concentric relation around the first rotatable member.

Both the first and second grooves extend circumferentially around their respective cylindrical surfaces. Furthermore, each of these grooves is shaped to have at least one component of axial excursion in a direction that is generally parallel with the axis of rotation of both the first and second rotatable members. This axial component of excursion causes relative axial motion to occur between the first and second rotatable members when an overtorque condition causes relative rotation between these members. At least one spherical ball is disposed in the first and second grooves between the first and second rotatable members to connect these members together. In an alternative embodiment of the present invention, a roller bearing can be used in place of the spherical ball.

A third rotatable member is disposed in axially slidable association with the second rotatable member and, in a preferred embodiment of the present invention, is disposed radially outward from the second rotatable member. The second and third rotatable members, in a preferred embodiment of the present invention, are connected together by a spline arrangement which permits the second and third members to move axially with respect to each other, but prevents relative rotation between them. This spline arrangement between the second and third rotatable members permits the second member to move axially with respect to both the first and third rotatable members when an overtorque condition is experienced between the first and second rotatable members.

A bias member is associated with the second rotatable member to provide an axial force in a preselected direction against the second rotatable member. Adjustment of the bias force and appropriate selection of the angle of axial excursion of the grooves is used to determine the magnitude of torque required to cause slippage between the first and second rotatable members. In a preferred embodiment of the present invention, this bias force is provided by a spring which extends between an axially fixed component and one axial end of the second rotatable member. This spring can be a circular spring or a plurality of disk spring washers arranged to provide the axial force against the second rotatable member.

In a preferred embodiment of the present invention, two or more spherical balls, or roller bearings, are used to connect the first and second rotatable members together, with each of the spherical balls being disposed in both the first and second grooves formed in the cylindrical surfaces of the first and second members. A plurality of axially extending grooves is formed in an outer surface of the second rotatable member and the inner surface of the third rotatable member to provide spline grooves in which connective devices can be disposed. In a preferred embodiment of the present invention, a plurality of spherical balls and cylindrical spacers are disposed in the spline grooves to permit the second and third rotatable members to move axially with respect to each other while maintaining a constant rotational position with each other. Various combinations of balls and cylindrical spacers are possible within the scope of the present invention and, in alternate embodiments, other spline arrangements can be used.

The first and second grooves of the first and second rotatable members, respectively, can be formed in various shapes within the scope of the present invention. For example, both the first and second grooves can be sinusoidal in shape with at least one period of the sinusoid extending circumferentially around the respective cylindrical surfaces. The amplitude of the sinusoid provides the axial component of excursion described above. In an alternate embodiment of the present invention, a plurality of generally straight segments can be connected at a preselected angle to permit the grooves to extend circumferentially around their respective cylindrical surfaces while having at least one axial component of excursion in a direction that is generally parallel to the axis of rotation of the first and second rotatable members. The number of periods described by either the sinusoid or straight segment embodiments described above can be varied to determine the specific design characteristics of the slip clutch. Furthermore, the extent of the axial component of excursion of the first and second grooves can be varied to determine the magnitude of axial movement experienced by the second rotatable member when an overtorque condition is experienced. It should also be understood that the selection of the extent of the axial component of excursion of the first and second grooves can be used to determine, along with the spring force described above, the magnitude of torque that is necessary to cause slippage between the first and second rotatable members of the present invention. The spring force and the extent of the axial component of excursion of the first and second grooves cooperates to determine the setting of torque at which the present invention permits slippage between the driving and its driven members connected to the first and third rotatable members.

The clutch mechanism of the present invention provides first, second and third rotatable members which are disposed in concentric relation with each other. A first cylindrical surface of the first rotatable member is shaped to define a first groove which extends circumferentially around the first cylindrical surface, to form a continuous closed path around the first cylindrical surface, with an axial component of excursion in a direction generally parallel to the axis of rotation of the first, second and third rotatable members. A second cylindrical surface of the second rotatable member is shaped to define a second groove which extends circumferentially around the second cylindrical surface, to form a continuous closed path around the second cylindrical surface, and has an axial component of excursion in a direction that is generally parallel to the axis of rotation of the three rotatable members. The first and second rotatable members are connected together by a connecting means which is disposed in the first and second grooves and which is shaped to permit relative axial and rotational movement between the first and second rotatable members. The present invention also provides a means for providing relative rotation between the second and third rotatable members which is adapted to permit relative axial movement between the second and third rotatable members. Furthermore, the present invention provides a means for biasing the second rotatable member in a preselected axial direction. In an alternative embodiment of the present invention, which will be described below, a means is provided for indicating an axial movement of the second rotatable member in a direction opposite to that which is urged by the biasing means. This indicating means can be a limit switch and can be used to indicate occurences of slippage between the first and second rotatable members of the present invention.

BRIEF DESCRIPTION OF THE DRAWING

The present invention will be more fully understood from a reading of the description of the preferred embodiment in conjunction with the drawing, in which.

DESCRIPTION OF THE PREFERRED EMBODIMENT

Figure 1:
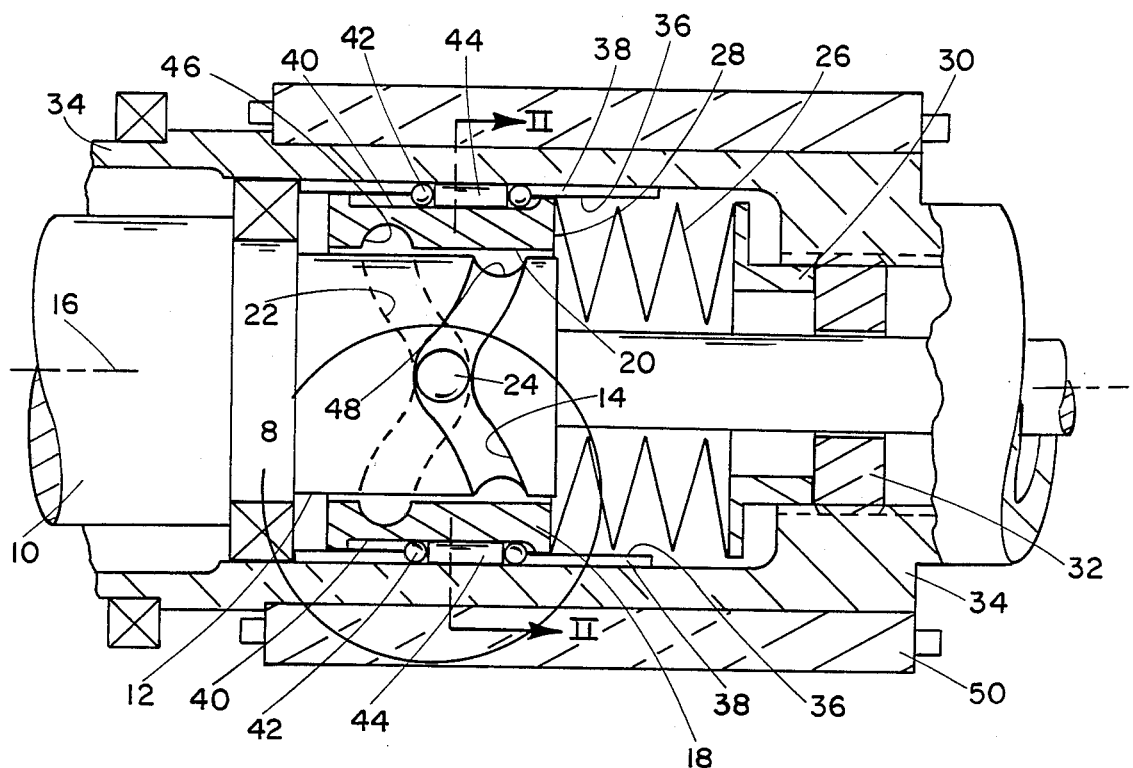
FIG. 1 illustrates a preferred embodiment of the present invention.
Figure 7:
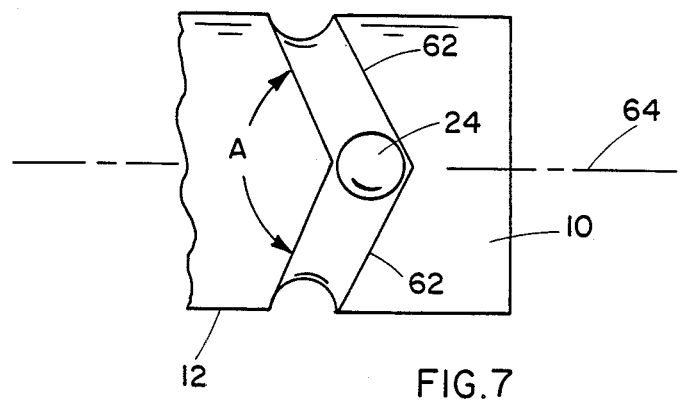
FIG. 7 illustrates an alternative shape of the groove in the first rotatable member of the present invention.

Referring to the figures, wherein like reference numerals are used to indicate like parts through out the various views, a preferred embodiment of the present invention will be described in detail. FIG. 1 illustrates one embodiment of the present invention in which a first rotatable member 10 is provided with an outer cylindrical surface 12 that is shaped to define a first groove 14 which forms a continuous closed path around the outer cylindrical surface 12. The first rotatable member 10 has a first axis of rotation 16. The first groove 14 extends circumferentially around the outer cylindrical surface 12 of the first rotatable member 10. As can be seen in FIG. 1, the first groove 14 has an axial component of excursion in a direction generally parallel to the first axis of rotation 16. This axial component of excursion can be provided by a groove 14 shaped as a sinusoid, as illustrated in FIG. 1, or any other suitable shape which causes the groove to vary in its axial position as it extends circumferentially around the outer cylindrical surface 12. An alternative shape of the first groove 14 is illustrated in FIG. 7 and will be described in greater detail below.

A second rotatable member 18 is disposed in concentric and coaxial relation with the first rotatable member 10. The second rotatable member 18 has a second axis of rotation which is generally coincident with the first axis of rotation 16 of the first rotatable member 10. The second rotatable member 18 is provided with an inner cylindrical surface 20 that is shaped to define a second groove 22 which forms a continuous closed path around the inner cylindrical surface 20. The second groove 22, which is formed in the inner cylindrical surface 20 of the second rotatable member 18, extends circumferentially around the inner cylindrical surface 20 and has at least one component of axial excursion which extends in a direction generally parallel to the first axis of rotation 16. As shown in FIG. 1, a second groove 22 which is generally sinusoidal in shape provides such an axial component of excursion which is suitable for the purposes of the present invention.

With the first 10 and second 18 rotatable members disposed in concentric and coaxial relation, as shown in FIG. 1, the first 14 and second 22 grooves overlap in at least one position to define at least one location of circumferential intersection. At least one spherical ball 24 is disposed in the first 14 and second 22 grooves, at such an intersection position, between the first and second rotatable members as illustrated in FIG. 1. In a preferred embodiment of the present invention, the first and second grooves are generally semicircular in cross sectional shape as shown and, at the point of intersection, a generally spherical ball 24 is maintained in position in both of the semicircular grooves. If no relative motion exists between the first 10 and second 18 rotatable members, the spherical ball 24 will be maintained in a specific position relative to both the first and second rotatable members. Therefore, it can be seen that the one or more spherical balls 24 disposed in the first and second grooves between the first and second rotatable members at the one or more points of intersection provide a means for connecting the first rotatable member 10 to the second rotatable member 18.

The present invention also provides a means for exerting an axial force against the second rotatable member 18 for purposes of biasing the second rotatable member in a preselected axial direction. In a preferred embodiment of the present invention, this bias force is provided by a spring 26. The spring 26 can be a cylindrical spring or, as indicated in FIG. 1, a plurality of disk spring washers disposed between an axial face 28 of the second rotatable member 18 and a spring adjustment member 30. In a preferred embodiment of the present invention, the spring adjustment member 30 is slidable in an axial direction parallel to the first axis of rotation 16. A threaded member 32 is used to adjustably determine the axial position of the spring adjustment member 30. For a given spring 26, the axial position of the spring adjustment member 30 can be used to determine the axial force against the second rotatable member 18. As can be seen in FIG. 1, the spring 26 exerts an axial force against the second rotatable member 18 in a direction toward the left in FIG. 1 and away from the spring adjustment member 30. This axial force against the second rotatable member 18 causes it to assume an axial and rotational position which places the spherical ball 24 in the second groove 22 at a position that defines the ball's limit of travel in an axial direction toward the right of the second rotatable member 18. The axial force provided by the spring 26 also causes the spherical ball 24 to assume a position in the first groove 14 at its axial limit of travel toward the left with respect to the first rotatable member 10. Therefore, without any external effects which tend to rotate any of the rotatable members shown in FIG. 1, the spring 26 will cause the spherical ball 24 to assume a position in the first 14 and second 22 grooves which causes the grooves to be disposed relative to each other as shown in FIG. 1.

A third rotatable member 34 is disposed radially outward from the second rotatable member 18 as shown in FIG. 1. The third rotatable member 34 is adapted to rotate with the second rotatable member 18 with no relative rotational movement therebetween. Furthermore, the third rotatable member 34 is adapted to permit axial movement between the second and third rotatable members. This relation between the second and third rotatable members is provided by a spline arrangement formed by the radially outward surface of the second rotatable member and the radially inward surface of the third rotatable member. More specifically, a plurality of axially extending grooves 40 is formed in the radially outward surface of the second rotatable member and a corresponding plurality of axially extending grooves 38 is formed in the radially inward surface of the third rotatable member 34. For this purpose, a radially inward protuberance 36 is formed in the inner portion of the third rotatable member 34. A plurality of axially extending grooves 38 is formed in the protuberance 36 and a corresponding plurality of axially extending grooves 40 is formed in the outer surface of the second rotatable member 18. Each of the grooves 38 is associated with one of the grooves 40 to form a plurality of axially extending channels that are disposed between the second 18 and third 34 rotatable members of the present invention. These channels form spline grooves in which a plurality of spherical balls 42 are disposed. Along with the spherical balls 42, a generally cylindrical spacer 44 is disposed in each of the axially extending spline grooves. It should be understood that the spherical balls 42 and the cylindrical spacers 44 act as a spline connection between the second and third rotatable members. As such, various combinations of spherical balls 42 and cylindrical spacers 44 can be used for this purpose. Furthermore, an alternative embodiment of the present invention could provide the spline connection between the second and third rotatable members by providing a plurality of interspaced rigid splines on both the second and third rotatable members. Any alternative configuration which permits the second and third rotatable members to move axially relative to each other while prohibiting relative rotational motion between these members is suitable for use in association with the present invention.

Grooves 38 and 40 are dimensioned axially so that, in combination with the sizes of the spherical balls 42 and the cylindrical spacers 44, the second rotatable member 18 is permitted to move axially with relation to the third rotatable member 34 by an amount which permits the first and second rotatable members to move axially with respect to each other by the amount determined by the first 14 and second 22 grooves. As can be seen in FIG. 1, the magnitude of the relative axial movement between the first and second rotatable members is determined by the amplitude, or axial component of excursion, of the generally sinusoidal shape of the first and second grooves. More specifically, the first and second rotatable members are shown at one extreme limit of travel of the second rotatable member 18. Since the first rotatable member 10 of the present invention is fixed, the maximum travel of the second rotatable member is determined when the spherical ball 24 is disposed, as shown in FIG. 1, in the portion of the second groove 22 which extends the maximum axial distance towards the spring 26. The opposite extent of travel of the second rotatable member 18 is in a direction toward the spring adjustment member 30 and would occur when the leftmost portion 46 of the second groove 22 is moved to an identical axial position with the rightmost portion 48 of the first groove 14. The maximum range of travel of the second rotatable member 18 can thus be generally defined as the magnitude of the axially extending component of excursion of the grooves in an embodiment when the first 14 and second 22 grooves are generally identical in shape. However, it should be understood that the shape of the first and second grooves of the present invention is not limited to sinusoidal shapes and, furthermore, the first and second grooves need not be identical in all embodiments of the present invention.

In FIG. 1, the third rotatable member 34 is shown as being attached to the rotor 50 of a motor. For purposes of this illustration of the preferred embodiment of the present invention, the third rotatable member 34 is the driving member and is attached to the rotor 50. However, alternative embodiments of the present invention could be driven by a gearing arrangement or any other suitable arrangement for transmitting torque to the third rotatable member 34. Furthermore, alternative embodiments of the present invention could utilize the first rotatable member 10 as the driving member and the third rotatable member 34 as the driven member although the preferred embodiment of the present invention has been described herein as utilizing the third rotatable member 34 as the driving member and the first rotatable member 10 as the driven member which would be connected to a device whose movement is to be caused by a prime mover that is attached to the third rotatable member 34.

Figure 2:
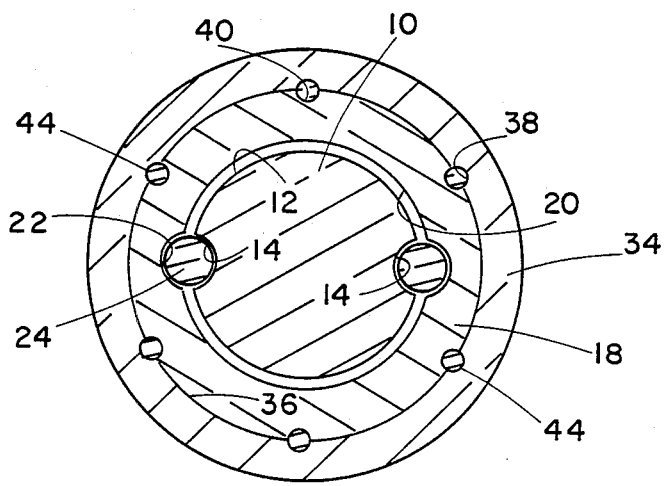
FIG. 2 is a sectional view of the structure illustrated in FIG. 1.

FIG. 2 illustrates a sectional view of the present invention illustrated in FIG. 1. As can be seen in FIG. 2, a first rotatable member 10 is provided with a first groove 14 formed in its outer cylindrical surface 12. A second rotatable member 18 is disposed in concentric and coaxial relation with the first rotatable member 10 and is provided with an inner cylindrical surface 20 which has a second groove 22 formed in it. One or more spherical balls 24 are disposed in the first and second grooves where the first and second grooves intersect or overlap. Comparing FIGS. 1 and 2, it can be seen that two points of intersection between the first and second grooves result from the use of sinusoidaly shaped grooves which each comprise two periods as they extend circumferentially around their respective cylindrical surfaces. In a preferred embodiment of the present invention, it it suggested that an even number of spherical balls 24 be utilized with a spherical ball 24 being disposed at each of the points of intersection between the first and second grooves.

As can be seen in FIG. 2, the second rotatable member 18 is provided with a plurality of axially extending grooves 40 in its radially outward surface. Furthermore, the protuberance 36 is also provided with a plurality of axially extending grooves 38 in its radially inward surface. These two pluralities of axially extending grooves are arranged to correspond with each other to form a plurality of axially extending channels, or spline grooves, in which spline connectors can be disposed. In FIG. 2, cylindrical spacers 44 are disposed in the spline grooves. As discussed above, and illustrated in FIG. 1, the cylindrical spacers 44 are disposed in the spline grooves along with a plurality of spherical balls 42 to provide a connection between the second and third rotatable members of the present invention. As shown in FIG. 2, it can be seen that the present invention provides a rotational connection between the protuberance 36 of the third rotatable member 34 and the second rotatable member 18. Furthermore, since the protuberance 36 is a part of the third rotatable member 34, the cylindrical spacers 44 and their associated spherical balls 42 provide a rigid rotational connection between the second and third rotatable members of the present invention. As can also be seen from FIGS. 1 and 2, the spherical balls 24 provide a rotational connection between the first and second rotatable members as long as the second rotatable member 18 does not move axially with respect to the first rotatable member 10. The spring 26 is used to bias the second rotatable member 18 in a preferred direction to inhibit its movement to the right in FIG. 1.

In operation, the third rotatable member 34 is caused to rotate around its axis of rotation 16 by some external device (e.g. the rotor 50 of a motor) and, because of the rotational connection provided by the spline arrangement described above between the second and third rotatable members, the second rotatable member 18 is caused to rotate with the third rotatable member 34. The first rotatable member 10 is caused to rotate with the second rotatable member 18 as long as the spherical ball 24 does not move in the first 14 and second 22 grooves. The axial force provided by the spring 26 against the second rotatable member 18 operates to maintain the spherical ball 24 at a fixed position relative to the first and second rotatable members. However, when the first rotatable member 10 encounters a sufficient resistance to its movement to cause a torque to exist between the first and second rotatable members of the present invention, the first and second rotatable members will tend to rotate relative to each other. This occurs because the rotation of the first rotatable member 10 is affected by some resistance to its rotational movement whereas the third rotatable member 34 continues to attempt to rotate. When relative rotational movement occurs between the first 10 and the second 18 rotatable members, the spherical ball 24 will be forced to move, within the first 14 and second 22 grooves, by rolling to a new position defined by the intersection of the first and second grooves. This point of intersection will move circumferentially around at least one of the first and second rotatable members because of the relative rotation between these members. The movement of the spherical ball 24 in the first and second grooves will cause the second rotatable member 18 to move axially with respect to the first rotatable member 10. The spring 26 provides an axial force against the second rotatable member 18 which acts to prevent this axial movement by the second rotatable member 18. Depending on the amount of relative torque experienced between the first and third rotatable members, the spherical ball 24 will move in the first and second grooves to a position of intersection which causes the second rotatable member 18 to move axially toward the spring adjustment member 30 and to compress the spring 26 by an amount which balances the force of the spring 26 with the axial force that is causing the relative rotational movement between the first and second rotatable members. If the torque experienced by the first rotatable member 10 is slight, the spherical balls 24 will assume a new position in the first and second grooves and rotation of all of the rotatable members will continue. If, however, the torque experienced by the first rotatable member 10 is significant, the relative rotation between the first rotatable member 10 and the second rotatable member 18 will be significant and the spherical ball 24 will continue to move to positions where the first and second grooves intersect. However, these points of intersection will continually change as the first rotatable member 10 rotates with respect to the second rotatable member 18 and the spherical balls 24 will continue to move circumferentially with respect to both the first and second rotatable members. This circumferential movement of the spherical balls 24 will cause the second rotatable member 18 to reciprocate axially between its extreme positions of movement that are determined by the shape of the first and second grooves. The spring 26 will experience sequential compressions and extensions to accommodate this axial motion of the second rotatable member 18.

The torque required to cause this relative rotational movement between the first and second rotatable members is determined by the axial position of the spring adjustment member 30. By adjusting the compression on the spring 26, the breakaway torque can be determined with significant accuracy as compared to friction clutches.

Figure 3:
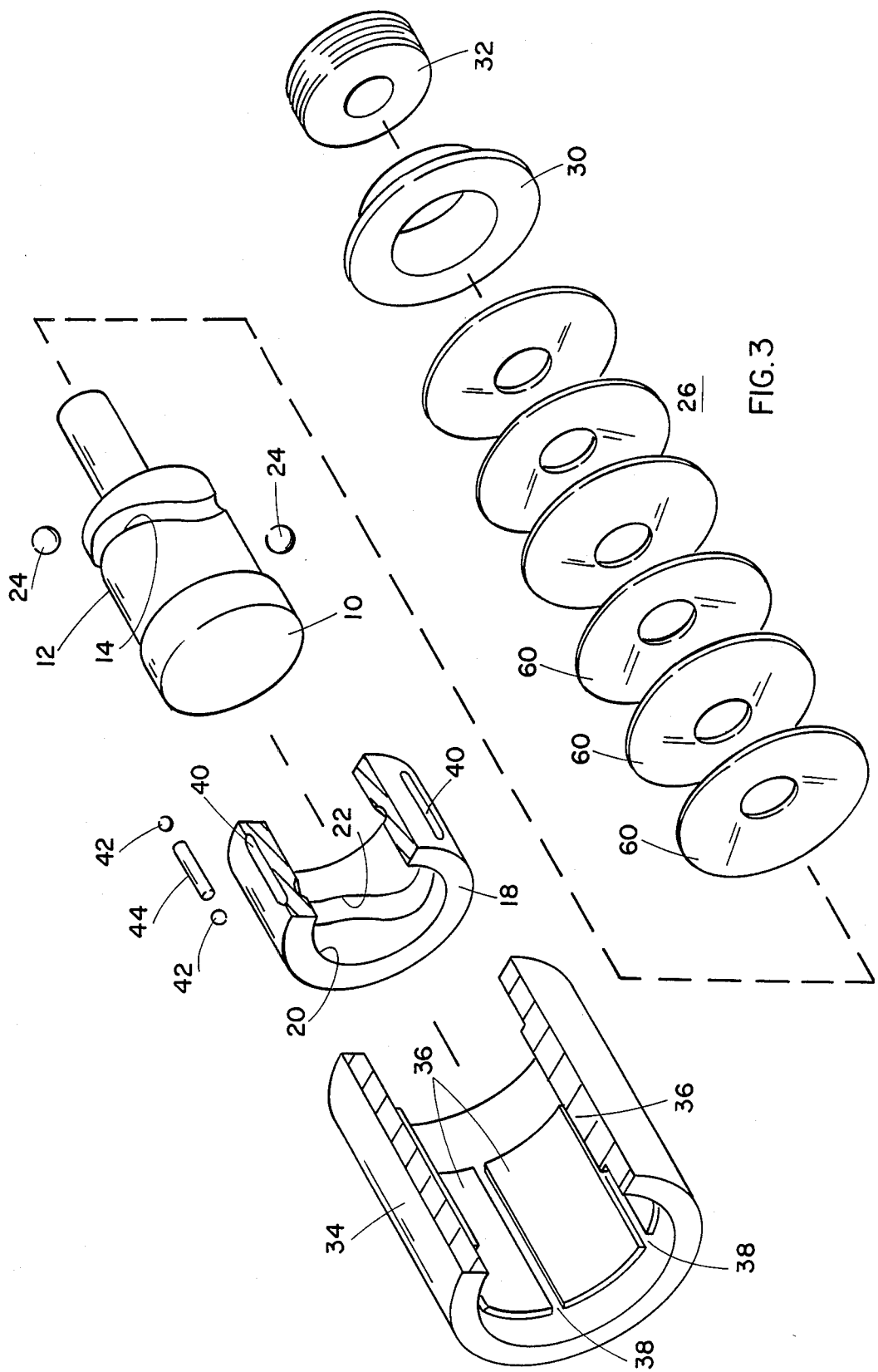
FIG. 3 is an exploded view of the structure illustrated in FIG. 1.

FIG. 3 illustrates an exploded view of the present invention. The protuberance 36 of the third rotatable member 34 is shown with its axially extending grooves 38. The second rotatable member 18 is shown with its axially extending grooves 40 and its second groove 22 which is shaped in the inner cylindrical surface 20. The first rotatable member 10 is shown with its outer cylindrical surface 12 and the first groove 14 shaped therein. In FIG. 3, two spherical balls 24 are shown. These spherical balls 24 are disposed in both the first 14 and second 22 grooves at positions where the first and second grooves intersect after the first and second rotatable members are assembled together. As can also be seen in FIG. 3, the axially extending grooves 38 in the protuberance 36 can be combined with the axially extending grooves 40 in the radially outward surface of the second rotatable member 18 to form axially extending spline grooves in which the spherical balls 42 and cylindrical spacer 44 can be disposed to prevent rotational movement between the second rotatable member 18 and the protuberance 36 which is a part of the third rotatable member 34. A plurality of disk spring washers 60 are shown in an alignment which permits them to be moved axially together to form the spring 26 which is illustrated in FIG. 1. As shown in FIG. 3, the spring 26 can be compressed by the spring adjustment member 30 which, in turn, is forced toward the second rotatable member 18 by the threaded member 32.

Figure 4:
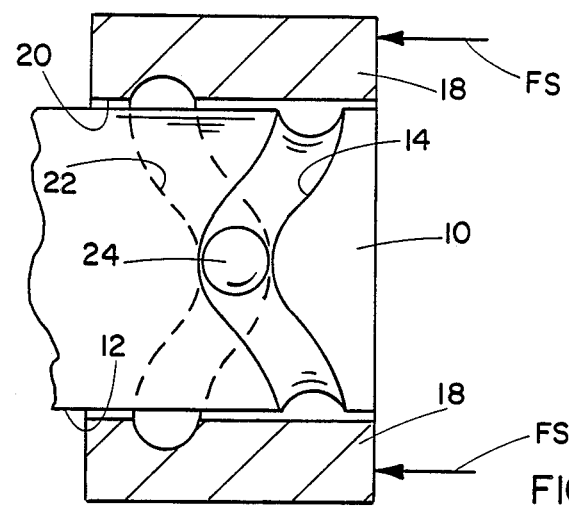
FIGS. 4, 5 and 6 show sequential positions of the first and second rotatable members of the present invention during an overtorque condition.
Figure 5:
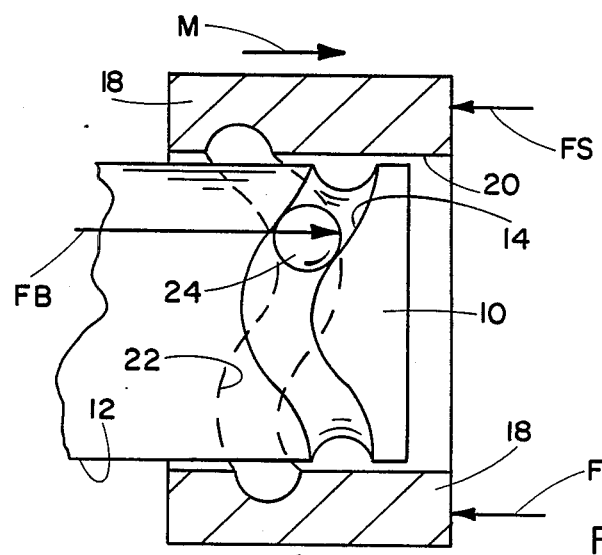
Figure 6:
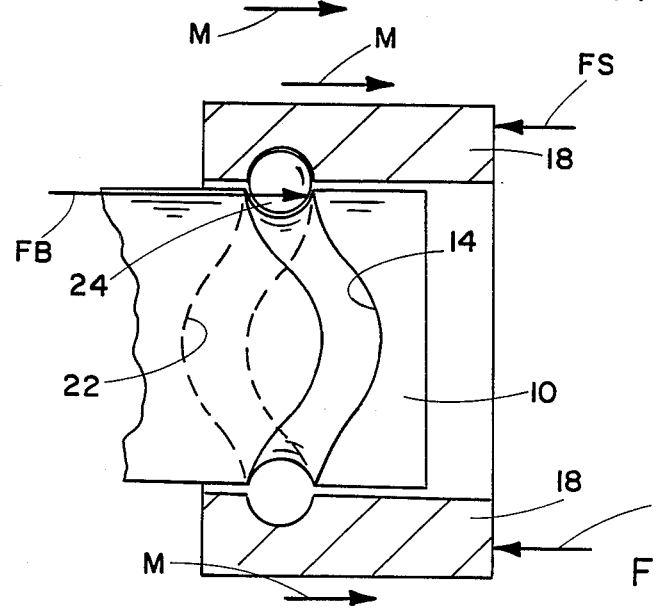

Referring to FIGS. 4, 5 and 6, the operation of the present invention will be described in greater detail with respect to the simplified schematic representations of the first 10 and second 18 rotatable members. It must be understood that the first rotatable member 10, in this preferred embodiment of the present invention, is not permitted to move axially. However, under certain circumstances, the second rotatable member 18 is intended to move axially in response to torque conditions. FIG. 4 illustrates the relationship between the first 10 and second 18 rotatable members along with the spherical ball 24 that is disposed at an intersection of the first 14 and second 22 grooves that are formed in the outer cylindrical surface 12 of the first rotatable member and inner cylindrical surface 20 of the second rotatable member 18, respectively. The spring force, indicated by arrows FS, exerts an axial force against the second rotatable member 18 which causes it to move toward its leftmost axial limit of travel that is determined by the relative shapes of the first and second grooves. This position is defined by the spherical ball 24 being disposed at the portion of the second groove 22 which extends axially farthest toward the right in FIG. 4. This permits the second rotatable member 18 to move axially farthest toward the left in FIG. 4. In this relative position between the first and second rotatable members, these two members are free to rotate together if no external force causes a relative torque to exist between them. The relative positions of the first 10 and second 18 rotatable members shown in FIG. 4 occur when these members are essentially at rest with no relative torque experienced between them and no relative rotational motion occurring between these components. FIG. 5 illustrates the condition that results from an external force exerting a torque between the first and second rotatable members. Relative rotation between the first 10 and second 18 rotatable members causes the point of intersection between the first and second grooves, 14 and 22 respectively, to shift circumferentially. This shifting of the intersection between the first and second grooves causes the spherical ball 24 to move circumferentially by rolling in both grooves. Furthermore, the shifting of the intersection point between the first and second grooves forces the second rotatable member 18 to move axially in a direction indicated by arrow M. This axial movement of the second rotatable member 18 in a direction toward the right of FIG. 5 is caused by a force, indicated by arrow FB, that is exerted by the spherical ball 24 against the second groove 22. When the first 10 and second 18 rotatable members experience a relative rotation between them, the spherical ball 24 exerts axial forces in opposite directions against both the first and second grooves, 14 and 22 respectively. However, since the axial movement of the first rotatable member 10 is restricted, movement caused by force FB is experienced by the second rotatable member 20 as shown in FIG. 5. It should be understood that the relative positions of the first and second rotatable members shown in FIG. 5 is typical for normal operation. The spherical ball 24 is expected to assume a position that is between the axial extremes of both the first and second grooves. As the second rotatable member 18 causes the first rotatable member 10 to rotate because of the existence of the spherical ball 24 in the first and second grooves, the spherical ball 24 is expected to move from the position shown in FIG. 4 to the position shown in FIG. 5 and remain at a location proximate the slopes of both of the grooves between their axially extreme positions. The spherical ball 24 will assume a position that results in a balance between the spring force FS and the force FB exerted by the spherical ball against the second groove 22. The resulting movement, indicated by arrows M, can be seen by comparing FIGS. 4 and 5 and noting that, in FIG. 5, the second rotatable member 18 is disposed farther toward the right, relative to the first rotatable member 10, than shown in FIG. 4. As described above, the spring force FS can be accurately set by using the threaded member 32 in conjunction with the spring adjustment member 30 as illustrated in FIGS. 1 and 3. Therefore, it should be understood that the second rotatable member 18 will only move axially toward the right against the force FS provided by the spring if the torque experienced between the first and second rotatable members is sufficient to permit the ball 24 to provide a force FB which will partially overcome the spring force FS provided by the spring. Therefore, the slip torque of the present invention is determined by the incline of the grooves and the setting the spring force FS provided by the spring 26 against the axial face of the second rotatable member 18.

If the torque between the first and second rotatable members is sufficient, the spherical ball 24 will be caused to continually travel along the first and second grooves to remain at the point of intersection between these grooves. This is illustrated in FIG. 6. This continual travel of the spherical ball 24 will result in a reciprocal motion of the second rotatable member 18. This reciprocating motion will continue until the overtorque condition ceases to exist. As shown in FIG. 6, the spherical ball 24 can continue to roll in both the first 14 and second 22 grooves as relative rotation continues between the first 10 and second 18 rotatable members. The spherical ball 24 in FIG. 6 is shown at a position which defines the axially leftmost portion of the first groove 14 and the axially rightmost portion of the second groove 22. The position of the spherical ball 24 in FIG. 6 thus defines the maximum movement of the second rotatable member 18 in a direction toward the right of FIG. 6 as indicated by arrows M. This position is indicative of the fact that the force FB exerted by the spherical ball 24 against the second groove 22 is sufficient to overcome the spring force FS to a degree which causes the second rotatable member 18 to move toward the right to an axial position which defines it maximum limit of travel in that direction. It should be noted that the spherical ball 24 is shown in FIG. 6 as having passed the sloping portions of both the first and second grooves. Any additional relative torque between the first and second rotatable members will cause the spherical ball 24 to continue rolling in both the first and second grooves until a balance between forces FB and FS is achieved. As the spherical ball 24 continues to roll in the first and second grooves, the second rotatable member 18 will begin to move toward the left in FIG. 6. As long as the force FB is sufficient to overcome the spring force FS, the second rotatable member 18 will continue to reciprocate axially as a result of the movement of the spherical ball 24 in both the first 14 and second 22 grooves. This reciprocating axial movement of the second rotatable member 18 permits relative rotation to occur between the first and second rotatable members and prevents damage that could otherwise be caused by an overtorque condition in which the second rotatable member 18 continues to rotate along with the third rotatable member (reference numeral 34 in FIGS. 1, 2 and 3) while the first rotatable member 10 is prevented from rotating by some external force such as a mechanical jam.

FIG. 7 illustrates an alternative embodiment of the grooves described above. The illustration in FIG. 7 shows the first rotatable member 10 with a groove formed in its outer cylindrical surface 12. The shape of the groove illustrated in FIG. 7 differs from the shape of the grooves described above and illustrated in FIGS. 1, 3, 4, 5, and 6. The groove shown in FIG. 7 comprises a plurality of straight segments 62 connected together at a preselected angle A. The shape of this groove, although distinctively different from the sinusoidal grooves described above, is acceptable for use in conjunction with the present invention because it satisfies the basic criteria described above. For example, it extends circumferentially around its related cylindrical surface 12. Furthermore, the groove shown in FIG. 7 also has at least one axial component of excursion that extends in a direction generally parallel with the axis of rotation 64 of the first rotatable member 10. This axial component of excursion permits the spherical ball 24 to travel along a path which transports the spherical ball 24 with an axial component of direction parallel to the axis of rotation 64. It should be understood that a corresponding groove would be provided in the inner cylindrical surface of a second rotatable member, as described above, and that second groove would be similar in configuration to the groove illustrated in FIG. 7. It should also be understood that other configurations are possible within the scope of the present invention. For example, a groove which extends circumferentially around its corresponding cylindrical surface along a path which lies in a plane that is not perpendicular to the axis of rotation of the rotatable members is acceptable. This type of groove has essentially one path that defines an axial excursion in one direction and a return path which returns to the starting point. Of course, it should be apparent that many different types of grooves will function properly with the present invention.

Figure 8:
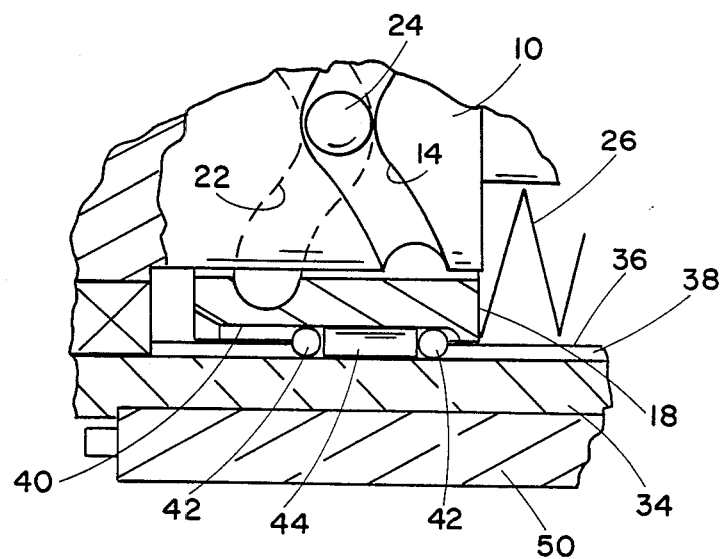
FIG. 8 is a view of the preferred embodiment shown in FIG. 1 which particularly illustrates the spline arrangement of the present invention.

FIG. 8 illustrates an enlarged view of a portion of FIG. 1. In FIG. 8, the first rotatable member 10 is shown with its groove 14 and the second rotatable member 18 is shown with its groove 22. The spherical ball 24 is disposed in both the first and second grooves and provides a connection between the first and second rotatable members. In the radially outward surface of the second rotatable member 18, an axially extending groove 40 is associated with a corresponding axially extending groove 38 formed in the protuberance 36 that extends radially inward from the third rotatable member 34. These two axially extending grooves 40 and 38 are aligned to form a spline groove in which spherical balls 42 and a cylindrical spacer 44 are disposed. It should be understood that alternative methods of connecting the second and third rotatable members in a spline arrangement are possible. It should be noted that the axial length of groove 40 extends beyond the combined length of the spherical balls 42 and the cylindrical spacer 44. This configuration provides a space in the axial length of groove 40 that permits the spherical balls 42 and cylindrical spacer 44 to move axially relative to the second rotatable member 18 to permit the second rotatable member to move axially with respect to the third rotatable member 34 without experiencing resistance from the spline connection components. Although this axial space in groove 40 is not an absolute necessity of the present invention, it is believed that it facilitates the axial movement of the second rotatable member 18 and prevents binding between the spherical balls 42 and the cylindrical spacer 44 with the groove 40. In a preferred embodiment of the present invention, the length of the axial space described above is generally equal to the axial extent of travel of the second rotatable member 18. It should be understood that the primary function of the spherical balls 42 and cylindrical spacer 44 is to operate as a spline connection between the second and third rotatable members and prevent relative rotational movement while permitting relative axial movement between the second and third rotatable members.

Figure 9:
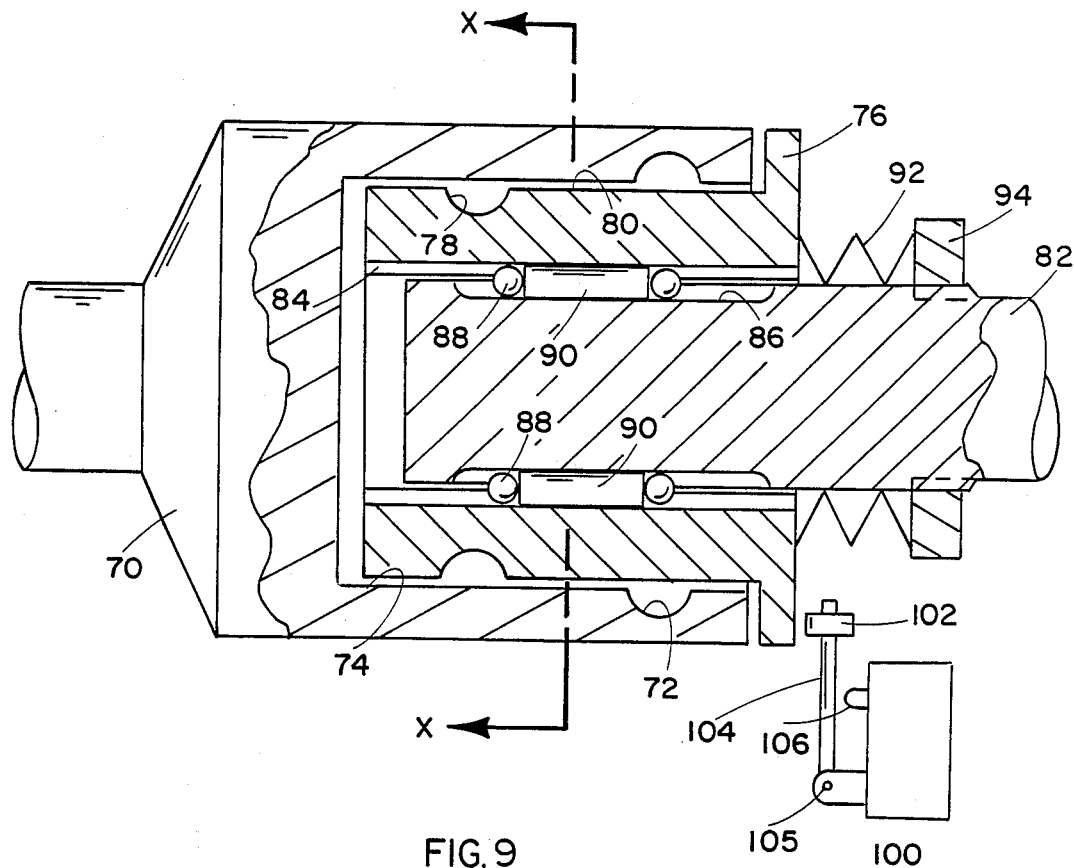
FIG. 9 illustrates an alternative embodiment of the present invention.

FIG. 9 illustrates an alternative embodiment of the present invention. A first rotatable member 70 is provided with a first groove 72 shaped in an inner cylindrical surface 74. A second rotatable member 76 is provided with a second groove 78 shaped in its outer cylindrical surface 80. A third rotatable member 82 is disposed within the second rotatable member 76 as shown in FIG. 9.

One or more spherical balls are disposed in both the first and second grooves as described above in conjunction with the discussion of FIG. 1. The one or more spherical balls which are disposed in both the first and second grooves provide a means for connecting the first and second rotatable members. The second rotatable member 76 is provided with a plurality of spline grooves 84 formed in its inner cylindrical surface. A corresponding number of spline grooves 86 are shaped in the outer cylindrical surface of the third rotatable member 82. The spline grooves 84 of the second rotatable member 76 and the spline grooves 86 of the third rotatable member 82 are aligned to form a plurality of spline channels in which spherical balls 88 and cylindrical spacers 90 are disposed. The spherical balls 88 and spacers 90 provide a spline mechanism which connects the second rotatable member 76 and the third rotatable member 82 together. This spline connection permits axial movement to occur between the second and third rotatable members but prevents relative rotational movement to occur between the second and third rotatable members.

A spring 92 is used to provide an axial force against the second rotatable member 76. A spring adjustment member 94 is provided to adjust the spring tension of the spring 92. The spring adjustment member 94 is threaded to the third rotatable member 82. The first 70, second 76 and third 82 rotatable members are disposed in coaxial association about a common axis of rotation.

The operation of the embodiment illustrated in FIG. 9 is generally similar to that of the embodiment illustrated in FIG. 1 and discussed above. The first groove 72 and the second groove 78 contain one or more spherical balls which are disposed at the one or more points of intersection between the first and second grooves. When a relative torque exists between the first 70 and third 82 rotatable members, relative rotational movement will occur between the first 70 and second 76 rotatable members. This relative rotational movement will cause the second rotatable member 76 to move axially relative to the first and third rotatable members. This axial movement of the second rotatable member 76 will occur when the force provided by the spherical balls would in the first and second grooves is sufficient to overcome the spring force provided by the spring 92. The movement of the spherical balls within the first and second grooves in the embodiment of the present invention illustrated in FIG. 9 is similar to the movement of the spherical balls in the embodiment described above and illustrated in FIG. 1. When this axial movement of the second rotatable member 76 occurs, the spline arrangement provided by the spline grooves 84 and 86 and the spherical balls 88 and cylindrical spacers 90 permits relative axial motion to occur between the second 76 and third 82 rotatable members while preventing relative rotation between these members.

It should be apparent that the embodiments of the present invention illustrated in FIGS. 1 and 9 are functionally similar in operation. It should also be apparent that the positions of the first and third rotatable members in these two embodiments are reversed. For example, in FIG. 1 the first rotatable member is disposed radially inward from both the second and third rotatable members. However, in FIG. 9 a first rotatable member 70 is disposed radially outward from the second and third rotatable members. Furthermore, the third rotatable member is disposed radially outward from the first and second rotatable members in the embodiment illustrated in FIG. 1, but is disposed radially inward from the first and second rotatable members in the embodiment illustrated in FIG. 9. Furthermore, the spline groove arrangement illustrated in FIG. 1 is disposed radially outward from the first and second grooves illustrated in FIG. 1 whereas the spline groove arrangement illustrated in FIG. 9 is disposed radially inward from the first and second grooves shown in FIG. 9. Therefore, it should be understood that the alternative embodiments illustrated in FIGS. 1 and 9 of the present application operate similarly to each other but utilize different physical arrangements of the first, second and third rotatable members.

The embodiment of the present invention illustrated in FIG. 9 illustrates the use of a limit switch 100 which is disposed in a position to detect axial movement of the second rotatable member 76. A limit switch 100 comprises an actuator arm 104 that has a rotatable when the second rotatable member 76 moves axially toward the right in FIG. 9, the actuator arm 104 is caused to rotate about pivot 105 and to depress a sensor 106. This type of switch can be used to sense the axial movement of the second rotatable member 76 which is caused by torque conditions existing between the first rotatable member 70 and the third rotatable member 82. When the limit switch 100 is activated, appropriate action can be taken. For example, a signal from the limit switch 100 can be used to deactivate the drive motor used in conjunction with the present invention or, alternatively, to count the number of occurences of overtorque conditions which occur. It should be understood that various types of limit switches can be used in conjunction with this embodiment of the present invention. It should also be apparent that, although the embodiments of the present invention illustrated in FIGS. 1 and 9 are similar in many ways, the embodiment illustrated in FIG. 9 more readily permits the use of the limit switch 100 or a similar device to respond to the axial movement of the second rotatable member 76.

Figure 10:
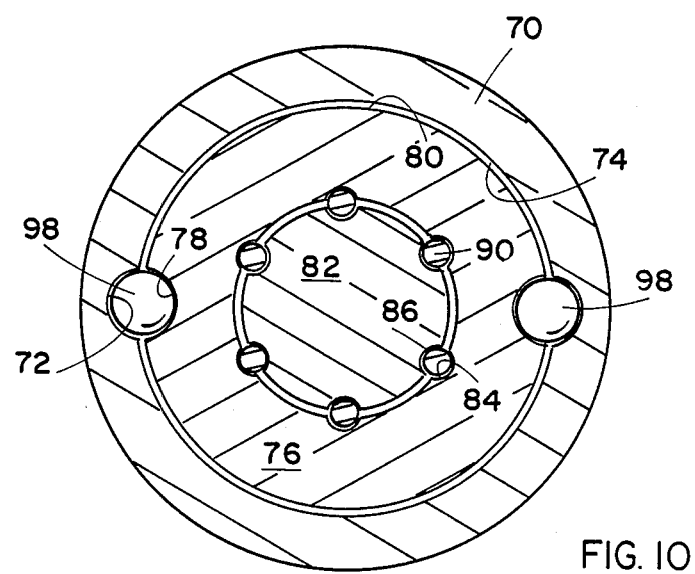
FIG. 10 is a sectional view of the embodiment of the present invention shown in FIG. 9.

FIG. 10 illustrates a sectional view of the embodiment of the present invention shown in FIG. 9. As can be seen, two spherical balls 98 are disposed in both the first 72 and second 78 grooves at their points of intersection. The spherical balls 98 provide a means for connecting the first rotatable member 70 with the second rotatable member 76. FIG. 10 also shows the plurality of cylindrical spacers 90 which are disposed in the spline grooves between the second rotatable member 76 and the third rotatable member 82. As discussed above, the spline arrangement which is disposed between the second rotatable member 76 and the third rotatable member 82 permits relative axial motion between these rotatable members. This axial movement occurs when the points of intersection between the first groove 72 and the second groove 78 move in response to relative rotational movement between the second rotatable member 76 and the first rotatable member 70.

Although the present invention has been described with significant specificity and a preferred embodiment has been discussed and illustrated in detail, it should be understood that other embodiments of the present invention are to be considered within scope.

What I claim is:
1. A clutch mechanism, comprising:
a first rotatable member having a first axis of rotation;
a second rotatable member disposed in concentric relation with said first rotatable member for rotation about said first axis of rotation;
a third rotatable member disposed in concentric relation with said first and second rotatable members for rotation about said first axis of rotation;
a first cylindrical surface of said first rotatable member being shaped to define a first groove, said first groove extending circumferentially around said first cylindrical surface to form a continuous closed path around said first cylindrical surface, said first groove having an axial component of excursion in a direction generally parallel to said first axis of rotation;
a second cylindrical surface of said second rotatable member being shaped to define a second groove, said second groove extending circumferentially around said second cylindrical surface to form a continuous closed path around said second cylindrical surface, said second groove having an axial component of excursion in a direction generally parallel to said first axis of rotation, said first and second cylindrical surfaces being disposed proximate each other;
means for connecting said first and second rotatable members together, said connecting means being disposed in said first and second grooves, said connecting means being shaped to permit relative axial and rotational movement between said first and second rotatable members;
means for preventing relative rotation between said second and third rotatable members, said preventing means being adapted to permit relative axial movement between said second and third rotatable members; and
means for biasing said second rotatable member in a preselected axial direction.

2. The clutch mechanism of claim 1, wherein:
said first rotatable member is disposed radially inward from said second rotatable member;
said first cylindrical surface is an outer cylindrical surface of said first rotatable member; and
said second cylindrical surface is an inner cylindrical surface of said second rotatable member.

3. The clutch mechanism of claim 1, wherein:
said first rotatable member is disposed radially outward from said second rotatable member;
said first cylindrical surface is an inner cylindrical surface of said first rotatable member; and
said second cylindrical surface is an outer cylindrical surface of said second rotatable member.

4. The clutch mechanism of claim 1, wherein:
said biasing means is a spring.

5. The clutch mechanism of claim 4, wherein:
said spring comprises a plurality of disk spring washers.

6. The clutch mechanism of claim 1, further comprising:
means for indicating an axial movement of said second rotatable member in a direction opposite to said preselected axial direction.

7. The clutch mechansim of claim 6, wherein:
said indicating means is a limit switch.

8. The clutch mechanism of claim 1, wherein:
said preventing means comprises a first plurality of axially extending grooves shaped in a third cylindrical surface of said second rotatable member, a corresponding second plurality of grooves shaped in a fourth cylindrical surface of said third rotatable member and a plurality of spherical balls, said first and second pluralities of axially extending grooves being arranged to define a plurality of channels between said second and third rotatable members with at least one of said plurality of spherical balls being disposed in each one of said plurality of channels.

9. The clutch mechanism of claim 1, wherein:
said first groove is shaped in the form of a sinusoid having an amplitude excursion extending axially along said first cylindrical surface of said first rotatable member.

10. The clutch mechanism of claim 9, wherein:
said sinusoid comprises two periods extending circumferentially around said first cylindrical surface of said first rotatable member.

11. A clutch mechanism, comprising:
a first rotatable member having a first axis of rotation and an outer cylindrical surface shaped to define a first groove, said first groove extending circumferentially around said outer cylindrical surface of said first rotatable member to form a continuous closed path around said outer cylindrical surface, said first groove having an axial component of excursion in a direction generally parallel to said first axis of rotation;
a second rotatable member having a second axis of rotation and an inner cylindrical surface shaped to define a second groove, said second groove extending circumferentially around said inner cylindrical surface of said second rotatable member to form a continuous closed path around said inner cylindrical surface, said second groove having an axial component of excursion in a direction generally parallel to said second axis of rotation, said first rotatable member being disposed within said second rotatable member in coaxial and concentric relation with said second rotatable member, said first axis of rotation being generally coincident with said second axis of rotation;

means for connecting said first and second rotatable members together, said connecting means being disposed in said first and second grooves, said connecting means being shaped to permit relative axial and rotational movement between said first and second rotatable members, said connecting means being shaped to move within said first and second grooves;

a third rotatable member being slidably associated with said second rotatable member;

means for preventing relative rotation between said second and third rotatable members, said preventing means being adapted to permit relative axial movement between said second and third rotatable members; and a bias member associated with said second rotatable member, said bias member being adapted to provide an axial force against said second rotatable member in a preselected direction.

12. The clutch mechanism of claim 11, wherein:
said connecting means comprises a spherical ball.

13. The clutch mechanism of claim 11, wherein: said bias member comprises a spring.

14. The clutch mechanism of claim 13, wherein:
said spring comprises a plurality of disk spring washers.

15. The clutch mechanism of claim 11, wherein:
said preventing means comprises a first plurality of axially extending grooves in the radially outer surface of said second rotatable member and a corresponding second plurality of axially extending grooves in the radially inner surface of said third rotatable member and a plurality of connecting members, each of said plurality of connecting members being disposed in an associated pair of said first and second pluralities of axially extending grooves.

16. The clutch mechanism of claim 11, wherein:
said first groove is shaped in the form of a sinusoid having its amplitude excursion extending axially along said outer cylindrical surface of said first rotatable member.

17. The clutch mechanism of claim 16, wherein:
said sinusoid comprises two periods extending circumferentially around said outer cylindrical surface of said first rotatable member.

18. The clutch mechanism of claim 11, wherein:
said second groove is shaped in the form of a sawtooth pattern with a plurality of generally straight segments joined together in a preselected angular relationship.

19. The clutch mechanism of claim 11, wherein:
said preventing means comprises a spline mechanism disposed radially between said second and third rotatable members.

20. A clutch mechanism, comprising:
a first rotatable member having a first groove shaped in a radially outer surface of said first rotatable member to form a continuous closed path around said radially outer surface, said first rotatable member having a first axis of rotation, said first groove having at least one axial component of excursion in a direction generally parallel to said first axis of rotation;

a second rotatable member having a second groove shaped in a radially inner surface of said second rotatable member to form a continuous closed path around said radially inner surface, said second rotatable member being disposed concentric with and radially outward from said first rotatable member, said second rotatable member being a second axis of rotation, said first and second axis of rotation being coincident, said second groove having at least one axial component of excursion in a direction generally parallel to said second axis of rotation;

first means disposed in said first and second grooves for connecting said first rotatable member to said second rotatable member, said first connecting means being adapted to permit axial and rotational relative motion between said first and second rotatable members;

a third rotatable member disposed radially outward from said second rotatable member;

second means for connecting said second rotatable member to said third rotatable member, said second connecting means being shaped to prevent relative rotation between said second and third rotatable members and to permit relative axial motion between said second and third rotatable members in a direction parallel with said first axis of rotation; and means for forcing said second rotatable member in a preselected axial direction.

21. The clutch mechanism of claim 20, wherein:
said first connecting means comprises a spherical ball.

22. The clutch mechanism of claim 21, wherein:
said first and second grooves are generally sinusoidal in shape.

23. The clutch mechanism of claim 22, wherein:
said forcing means comprises a spring.

24. The clutch mechanism of claim 23, wherein:
said second connecting means comprises a plurality of axially extending channels formed at a cylindrical interface between said second and third rotatable members, each of said plurality of axially extending channels being formed by a combination of one of a plurality of axially extending grooves formed in a radially inward surface of said third rotatable member and one of a plurality of axially extending grooves formed in a radially outward surface of said second rotatable member.

25. The clutch mechanism of claim 24, wherein:
said first groove is shaped to have a generally semi-circular cross section.

26. The clutch mechanism of claim 25, wherein:
said second groove is shaped to have a generally semi-circular cross section.

27. The clutch mechanism of claim 26, wherein:
said spring comprises a plurality of disk spring washers.

28. The clutch mechanism of claim 27, wherein:
said sinusoidal shape of said first and second grooves is defined by an amplitude portion which extends in a direction parallel to said first axis of rotation.

29. The clutch mechanism of claim 28, wherein:
said sinusoidal shape of said first groove comprises two periods disposed circumferentially around said first rotatable member.

* * * * *